May 20, 1941.  H. PLANT  2,243,050
PROCESS OF PRODUCING SPINNABLE FIBERS AND CELLULOSE FROM PLANTS
Filed June 27, 1938
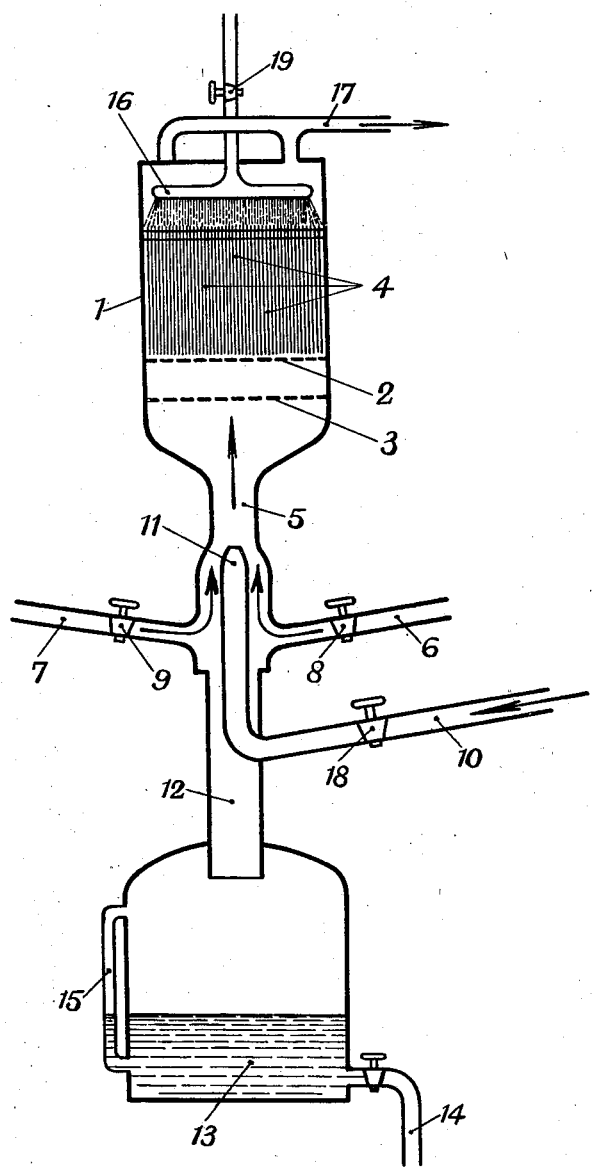
Inventor.
H. Plant
By C. F. Nenderoth
Atty Patented May 20, 1941

2,243,050

UNITED STATES PATENT OFFICE 2,243,050

PROCESS OF PRODUCING SPINNABLE FIBERS AND CELLULOSE FROM PLANTS

Hendricus Plant, Wassenaar, Netherlands, assignor to N. V. Exploitatie Maatschappij voor Chemische Uitvindingen (E. C. U.), Wassenaar, Netherlands Application June 27, 1938, Serial No. 216,160
In the Netherlands August 3, 1937

8 Claims. (Cl. 92—13)

It is known that in plants, and parts of plants, which contain fibers, and in plants, and parts of plants, which are more woody, such as wood and straw, impurities such as lignin, pectine substances, adhesives, gelatinous substances, pentosan, vegetable glue, vegetable albumen, etc., can in their natural state or after chlorination or oxidation be dissolved in water or alkaline lye much more readily than the fibers and cellulose of the structural form occurring in wood and straw. Most colouring matters occurring in fibrous plants can also be permanently decolorized by oxidation, and be taken up and removed by means of alkaline lye.

According to the invention the oxidation of the impurities, which is more rapid than that of the fibers and cellulose, is utilized for obtaining the fiber and cellulose, the impurities being dissolved and separated, after being oxidised as far as necessary without damage to the fibers or cellulose. This enables clean, spinnable fibers to be obtained from plants and parts of plants containing fibers. It is also possible by means of the invention to obtain cellulose suitable for paper or artificial silk manufacture from wood and straw and from the to a large extent woody cores found in many fibrous stalks, e. g. ramie, flax, hemp, jute, rosella (*Sabdariffa var. altissima*) and so on, containing cellulose of a structure not suitable for textile purposes.

The process according to the invention is characterized in that plants or parts of plants are treated at normal pressure with aqueous alkaline lye in the presence of air and heated aqueous vapor. This treatment may proceed till the fibers are detached from the core and have become white, whereupon they are separated from the woody parts, rinsed in water, preferably warm, and then if necessary acidulated (treated with acid for neutralization). By this treatment the impurities which bind the fibers to each other and to the core are removed, with the exception of a thin outer layer which surrounds the fibers and protects them from injury by the oxygen of the air. This thin layer, which consists of impurities already attacked, adhering only very lightly to the fiber, can easily be removed by the rinsing of the fiber with water, preferably warm. The treatment may, however, be carried up to a point at which this very thin layer is also removed, but in that case care must be taken to cut off access of air at an early stage.

As the fibers surround the woody core and are therefore first subjected to the combined action of alkaline lye, air and heated aqueous vapor, the core is only slightly affected by the treatment, or not at all. If the cellulose is to be obtained from the woody core the same is subjected to the same treatment, after removal of the fibers.

Preferably the treatment according to the application is started with preliminary soaking of the plants or parts of plants with aqueous alkaline lye of moderate strength, e. g. 6% at normal temperature or temperatures not exceeding 40 to 55° C.

The plants or parts of plants thus treated, that is to say soaked with alkaline lye but not boiled therein, are subjected to the action of air and heated aqueous vapor. The combined action of the alkaline lye, oxygen of the air, and heated aqueous vapor effects the desired purpose.

Instead of first soaking the plants or parts of plants with alkaline lye and then subjecting them to the action of air and heated aqueous vapor, the plants or parts of plants may immediately be placed in the chamber where they are subjected to the action of air and heated aqueous vapor, and the material to be treated may be sprayed therein with aqueous alkaline lye. In this case the material is first treated with air and heated aqueous vapor and then sprayed with the aqueous alkaline lye. In this case the air used for the treatment may be saturated with moisture to a degree specially suitable for the treatment.

In the case of very thick material such as the lower ends of hemp, rosella (*Sabdariffa var. altissima*) and jute stalks and the like the strength of the alkaline lye used for soaking may be somewhat increased, say to 8%, and the saturation may be effected under pressure.

In the case of very long stalks, sometimes of a length of several metres, the air and aqueous vapor may be admitted in several places. To prevent excessive conversion of the alkaline lye into to alkali carbonate by the carbon dioxide of the air, carbon dioxide may be removed from the admitted air, e. g. by passing the air over soda lime. The regulation of the moisture content of the air, if such be necessary, is effected after this has been done.

The process according to the invention has the advantage that no retting of any kind is required, and that it avoids protracted treatment with boiling alkali, which is very injurious to the strength of the fiber. The treatment converts, dissolves and removes colouring matter, so that clean fibers are obtained, while useful cellulose can be produced from the woody cores, hitherto regarded as valueless.

The invention is more fully explained by the drawing, which diagrammatically represents an apparatus for carrying out the process. Flax stalks, at ordinary temperature or a temperature of from 40 to 55° C. (depending on the quality of the flax) are at atmospheric pressure introduced into a 6% aqueous solution of sodium hydroxide or potassium hydroxide, and left till the stalks are saturated with the lye. In this state, without being washed, the stalks are placed in a vessel 1, in which they are looped over transverse bars so that their ends are just above the grid 2. Or the stalks may stand vertically on the grid 2. Then heated aqueous vapor is admitted through a pipe 10, which is fitted with a regulating cock and forms an injector sucking in air from pipes 6 and 7. The supply of air can be regulated by means of cocks 3 and 9. The heated aqueous vapor mixed with air rises in the pipe 5 and passes along the alkali-soaked flax stalks on all sides thereof. Generally the temperature is kept below 90° C. Air and uncondensed aqueous vapor may be sucked out of the vessel 1 through the pipe 17. The suction does not serve to create a vacuum in the vessel 1, but is only used to ensure a uniform flow along the stalks with regular and even oxidation by the oxygen of the air.

The water of condensation produced by the contact of the heated aqueous vapor with the colder fibers flows through the pipe 12 to the tank 13, which has a water gauge and a discharge pipe. The water of condensation deposited on the stalks carries away the matter dissolved by the soda lye, and takes it to the tank 13. The lye taken from the tank may be regenerated and used again. If the heated aqueous vapor does not furnish sufficient water of condensation additional water may be supplied by imparting to the air used a suitable moisture content.

In order that the soda lye present in the fibers at the beginning of the treatment should not become too much saturated with impurities, and should not be too much diluted by the water of condensation, a slowly rotating sprayer 16 with a regulating cock 18 may be used for spraying the material with 6% soda or potassium lye at a temperature of about 55° C.

As the water of condensation drawn from the tank 13 takes the lye containing the impurities with it, and fresh lye is sprayed on to the plant material by the sprayer 16, the effect of the alkali lye is as thorough as possible.

The cocks 8, 9, 18 and 19 enable the supply of air, heated aqueous vapor and alkali lye to be properly co-related.

The treatment of the plants or parts of plants is continued till the colour of the out-flowing used lye changes from brown to light yellow and the fibers are from bottom to top quite loose and detached from the cores, and nearly white. The purpose of the grid 3 is to prevent particles of the material which pass through the grid 2 from reaching the tank 13. The supply of heated aqueous vapor and air, and the exhaust of air and aqueous vapor are then stopped, and the material is taken out of the cylinder 1 when it has cooled somewhat. The cores of the flax stalks are then very soft and brittle, and the fiber can easily be detached. The fibers are up to the last surrounded by a thin layer of impurities protecting them from attack by the oxygen of the air. This thin layer can easily be removed by washing the material in an abundance of warm water. For removing traces of sodium or potassium lye a treatment with acid, e. g. dilute hydrochloric acid, may be used. The fibers then have a good sheen, and are white.

It is to be noted that the treatment as described can also be applied to markedly woody plants, such as wood and straw, having no fiber suitable for textile purposes, the object being to obtain cellulose.

The woody parts separated from the fiber, whether they are derived from fibrous plants or parts of plants, or from plants or parts of plants having no fiber suitable for textile purposes, may be treated as follows:

1. The woody parts are treated in the same way as the fibers, that is to say they are repeatedly washed in warm water, and if necessary with acid, being then, when dry, stored for further treatment.

2. The woody parts, without being washed, are again treated in the vessel 1 with alkali lye, air and heated aqueous vapor, till the lignin is removed and nearly pure cellulose is obtained, whereupon the material is washed with warm water and if necessary treated with acid.

3. The woody parts are, as in (2), treated with alkaline lye, air and heated aqueous vapor, but are then sprayed by the sprayer 16 with cold alkaline lye, or 4 to 6% concentration, till all the residual lignin is removed. The material is then taken from the vessel 1 and mercerized, without being washed with alkaline lye, and converted by means of carbon disulphide into xanthogenate, which can be used for the manufacture of artificial silk.

What I claim is:

1. The process of producing spinnable fibers and cellulose from plants or parts of plants comprising subjecting the material to the simultaneous action at atmospheric pressure of aqueous alkali metal lye and a mixture of air and steam, the mixture of air and steam being such that by its contact with the material being treated, a sufficient amount of water of condensation is formed to remove the alkali metal lye and the encrustations from the treated parts of the material, and directly discharging said water of condensation and simultaneously removing lye and encrustations by entrainment in said water.

2. The process of producing spinnable fibers and cellulose from plants or parts of plants comprising first treating the said material with an aqueous alkali metal lye and then subjecting the treated material at atmospheric pressure to the joint action of an aqueous alkali metal lye and a mixture of air and steam, the mixture of air and steam being such that by its contact with the material being treated, a sufficient amount of water of condensation is formed to remove the alkali metal lye and the encrustations from the treated parts of the material, and directly discharging said water of condensation and simultaneously removing lye and encrustations by entrainment in said water.

3. The process of producing spinnable fibers and cellulose from plants or parts of plants comprising first treating the material with a mixture of air and steam and then subjecting the treated material at atmospheric pressure to the joint action of an aqueous alkali metal lye and a mixture of air and steam, the mixture of air and steam being such that by its contact with the material being treated, a sufficient amount of water of condensation is formed to remove the alkali metal lye and the encrustations from the treated parts of the material, and directly discharging said water of condensation and simultaneously removing lye and encrustations by entrainment in said water.

4. The process according to claim 1 wherein during the joint action of air, steam and alkali metal lye, additional aqueous alkali metal lye is temporarily sprayed on to the material.

5. The process according to claim 1 wherein the aqueous alkali metal lye is at a temperature of about 40-55° C., the temperature to which the material is subjected being below 90° C.

6. The process according to claim 2, wherein the aqueous alkali metal lye is at a temperature of about 40-55° C., the temperature to which the material is subjected being below 90° C.

7. The process according to claim 3 wherein the aqueous alkali metal lye is at a temperature of about 40-55° C., the temperature to which the material is subjected being below 90° C.

8. The process according to claim 1, and removing the water of condensation and entrained alkali metal lye and encrustations as well as freed fibers from the treated material, subjecting the remaining woody material to another treatment with aqueous alkali metal lye, air and steam, as recited in claim 1, until the lignin is removed therefrom, and then washing the remaining material.

HENDRICUS PLANT.